(12) United States Patent
Cruanes et al.

(10) Patent No.: US 7,603,339 B2
(45) Date of Patent: Oct. 13, 2009

(54) MERGING SYNOPSES TO DETERMINE NUMBER OF DISTINCT VALUES IN LARGE DATABASES

(75) Inventors: Thierry Cruanes, Foster City, CA (US); Uri Shaft, Castro Valley, CA (US); Hong Su, Foster City, CA (US); Benoit Dageville, Foster City, CA (US); Sunil P. Chakkappen, Foster City, CA (US); Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 338 days.

(21) Appl. No.: 11/796,110

(22) Filed: Apr. 25, 2007

(65) Prior Publication Data

US 2008/0120275 A1   May 22, 2008

Related U.S. Application Data

(60) Provisional application No. 60/859,817, filed on Nov. 16, 2006, provisional application No. 60/919,379, filed on Mar. 21, 2007.

(51) Int. Cl.
  *G06F 7/00*   (2006.01)
  *G06F 17/30*   (2006.01)
  *G06F 17/00*   (2006.01)
(52) U.S. Cl. .................. 707/1; 707/102; 707/104.1
(58) Field of Classification Search .............. 707/12, 707/3, 6, 100, 102, 104.1
  See application file for complete search history.

(56) References Cited

U.S. PATENT DOCUMENTS 6,665,684 B2   12/2003   Zait et al.
6,757,675 B2    6/2004   Aiken et al.
7,092,954 B1    8/2006   Ramesh (Continued)

OTHER PUBLICATIONS

Poess, Meikel, et al., "New TPC Benchmarks for Decision Support and Web Commerce", ACM Press, retrieved from website: < http://www.sigmod.org/record/issues/0012/standards.pdf >, published Dec. 2000, 8 pages.

(Continued)

*Primary Examiner*—Hung T Vy
*Assistant Examiner*—Merilyn P Nguyen
(74) *Attorney, Agent, or Firm*—Hickman Palermo Truong & Becker LLP

(57) ABSTRACT

A method and apparatus for merging synopses to determine a database statistic, e.g., a number of distinct values (NDV), is disclosed. The merging can be used to determine an initial database statistic or to perform incremental statistics maintenance. For example, each synopsis can pertain to a different partition, such that merging the synopses generates a global statistic. When performing incremental maintenance, only those synopses whose partitions have changed need to be updated. Each synopsis contains domain values that summarize the statistic. However, the synopses may initially contain domain values that are not compatible with each other. Prior to merging the synopses the domain values in each synopsis is made compatible with the domain values in the other synopses. The adjustment is made such that each synopsis represents the same range of domain values, in one embodiment. After "compatible synopses" are formed, the synopses are merged by taking the union of the compatible synopses.

20 Claims, 6 Drawing Sheets

U.S. PATENT DOCUMENTS

| | | | |
|---|---|---|---|
| 7,124,146 B2 * | 10/2006 | Rjaibi et al. | 707/102 |
| 7,480,302 B2 | 1/2009 | Choi | |
| 7,512,589 B2 | 3/2009 | Stokkan et al. | |
| 2005/0262057 A1 * | 11/2005 | Lesh et al. | 707/3 |
| 2006/0083227 A1 | 4/2006 | Eldar | |
| 2006/0242694 A1 * | 10/2006 | Gold et al. | 726/13 |
| 2007/0043757 A1 | 2/2007 | Benton et al. | |
| 2007/0226237 A1 | 9/2007 | Gong et al. | |
| 2008/0120274 A1 | 5/2008 | Cruanes et al. | |

OTHER PUBLICATIONS

Selinger, P. Griffiths, et al., "Access Path Selection in a Relational Database Management System", ACM Inc., Proceedings of the 1979 ACM SIGMOD International Conference on the Management of Data, dated Oct. 2002, pp. 23-34.

Cyran, Michele, et al., "Oracle® Database Concepts", Oracle, 10g Release 2 (10.2), dated Oct. 2005, 16 pages.

publib.boulder.ibm.com, "Collecting statistics on a sample of the table data", DB2 Version 9 for Linux, UNIX, and Windows, retrieved from website: http://publib.boulder.ibm.com/infocenter/db2luw/v9/index.jsp?topic=/com.ibm.db2.udb.admin.doc/doc/c0011393.htm >, last updated Oct. 27, 2006, 1 page.

publib.boulder.ibm.com, "RUNSTATS command", DB2 Version 9 for Linux, UNIX, and Windows, Retrieved from website: http://publib.boulder.ibm.com/infocenter/db2luw/v8/index.jsp?topic=/com.ibm.db2.udb.doc/core/r0001980.htm, last updated Oct. 27, 2006, 8 pages.

Microsoft, "SQL Server Query Optimization and Tuning", Microsoft TechNet, Retrieved from website: < http://www.microsoft.com/technet/community/chats/trans/sql/sql0909.mspx >, Published Sep. 9, 2003, 7 pages.

Hanson, Eric N., et al., "Statistics Used by the Query Optimizer in Microsoft SQL Server 2005", Microsoft TechNet, retrieved from website: < http://www.microsoft.com/technet/prodtechnol/sql/2005/qrystats.mspx >, printed Mar. 27, 2007, 13 pages.

Gibbons, Phillip B., et al., "Distinct Sampling for Highly-Accurate Answers to Distinct Values Queries and Event Reports", Proceedings of the 27$^{th}$ VLDB Conference, 2001, 10 pages.

Othayoth, Raghunath, et al., "The Making of TPC-DS", Copyright 2006 VLDB Endowment, ACM, retrieved from website: < http://www.vldb.org/conf/2006/p1049-othayoth.pdf >, 10 pages.

* cited by examiner

300
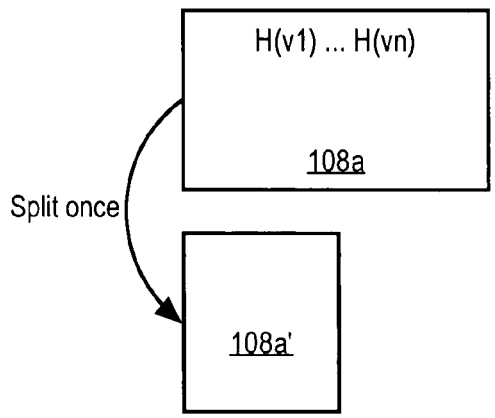
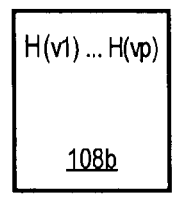
FIG. 3
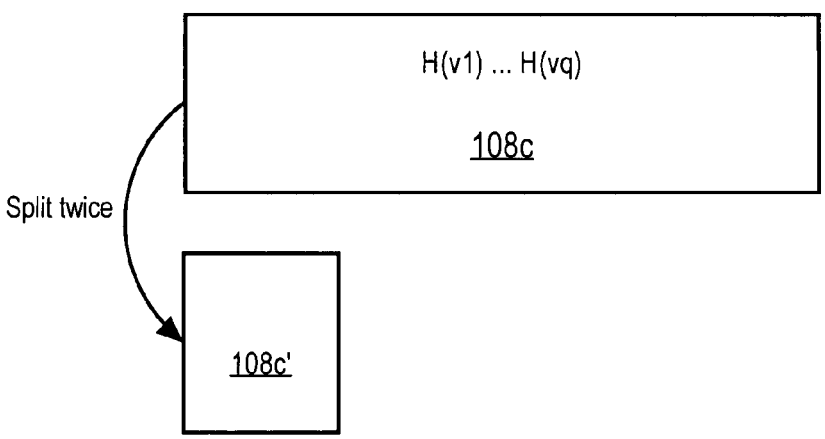
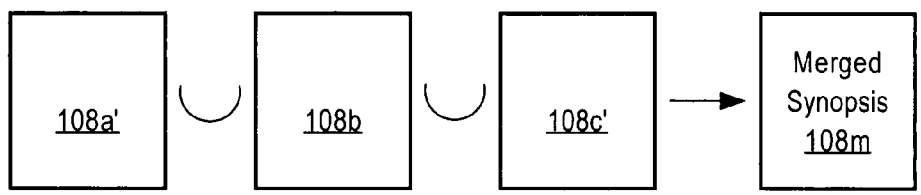

MERGING SYNOPSES TO DETERMINE NUMBER OF DISTINCT VALUES IN LARGE DATABASES

RELATED APPLICATIONS

This application claims benefit of Provisional Application Ser. No. 60/919,379, filed Mar. 21, 2007, entitled "Efficient and Scalable Statistics Gathering for Large Databases," by Cruanes et al., the entire contents of which are incorporated by reference as if fully set forth herein.

The present application is related to U.S. patent application Ser. No. 11/796,102, entitled "Approximating a Database Statistic," filed on Apr. 25, 2007, by Thierry Cruanes, et al.

The present application is related to U.S. patent application Ser. No. 11/796,102, entitled "Approximating a Database Statistic," filed on Apr. 25, 2007, by Thierry Cruanes, et al.

FIELD OF THE INVENTION

The present invention relates to databases. In particular, the present invention relates to approximating a database statistic.

BACKGROUND

Database partitioning improves the search efficiency of the database system in certain situations by avoiding the need to search an entire table. With database partitioning, an object, such as a database table, is divided up into sub-tables, referred to as "partitions". The particular partition in which a row or object is stored depends on values in one or more columns of the table. These columns are referred to herein as partition keys and the values contained in them are referred to as partition key values.

The most common form of partitioning is referred to as range partitioning. With range partitioning, each individual partition corresponds to a certain range of partition key values. For example, a partition key of a table may store date values that fall within a certain year, and the table may be divided into twelve partitions, each of which corresponds to a month of that year. Rows with a date value that fall within a certain month are stored in the partition that corresponds to that month.

Another form of partitioning is referred to as hash partitioning. In hash partitioning, one or more values in partition keys are applied to a hash function to produce a hash value. A separate partition is established for a hash function value produced by the hash function, and rows having a partition key value that evaluates to that hash function value are stored within the partition.

Statistics are often kept pertaining to data stored in a database. In partitioned tables, statistics may be kept at both the partition level ("partition statistics") and the table level ("global statistics"). An example use for these statistics is a cost-based query optimizer; however, other uses exist. A cost-based optimizer chooses an optimum execution plan for an SQL statement based on statistics about the data accessed by the statement. It is therefore crucial for the quality of the execution plan that statistics accurately reflect the state of the database objects.

Both partition and global statistics are important to a query optimizer. Partition statistics, which apply to a particular database partition, are useful because of a technique called "partition pruning." Given a query, the query optimizer may eliminate (i.e., prune) unnecessary partitions from access by the SQL query. For example, consider the example table "line_item" that is partitioned on a "ship_date" column so that line items that are shipped in the same month fall into the same partition. Further, consider the query:

select * from line_item where ship_date between '2006-06-01' and '2006-06-30' and tax >10000

The above query will be issued only on the partition that contains all the line items shipped in June 2006. Partition pruning reduces the volume of data accessed and can lead to substantial performance improvement. If a query is found out to be pruned down to a single partition, statistics on this particular partition can further help the optimizer to find a good execution plan. In the previous example, suppose there is an index on a tax column in all partitions. In this case, the query optimizer can rely on partition statistics on the selectivity of tax >10000 in the June 2006 partition to choose between a full-scan and an index-scan on the partition.

A particular statistic of interest is the number of distinct values (NDV) in a portion of a table. To determine the NDV, most commercial database systems read rows from the table and count the NDV by performing an expensive aggregate operation. The aggregate operation involves sorting or hashing the input rows. The database system minimizes the resources by performing the aggregation on a subset of rows produced by sampling of the data. The count computed from the sample is then scaled up to represent the entire population. The sample size required for accurately estimating the NDV depends on the data distribution of the columns.

Two strategies for sampling the data include row sampling and block sampling. Row sampling reads rows without regard to their physical placement on disk. This provides the most random data for estimates, but can result in reading more data than necessary. For example, a row sample might select one row from each block, requiring a full scan of the table or index.

Block sampling reads a random sample of blocks and uses all of the rows in those blocks for estimates. This reduces the amount of I/O activity for a given sample size, but it can reduce the randomness of the sample if rows are not randomly distributed on disk. Reducing the randomness can affect the quality of the estimate of number of distinct values.

Both row and block sampling techniques produce inaccurate statistics for some tables. Some database systems recommend collecting statistics for those objects manually using a 100% sample and leave those objects untouched by automatic statistic collection. However, the statistic collection on large sample is expensive. For large tables, some database systems recommend using a 1% sample. Statistics collected using such a small sample can be very inaccurate.

One problem with determining an NDV is determining an adequate sample size. One possible solution for automatically determining an adequate sample size is an iterative approach. Initially, a small sample is taken for each column. Based on statistical analyses, a determination is made as to whether the sample size for each column is large enough. For each column needing a larger sample, the sample size is increased. However, in the next iteration of sampling, the information collected is restricted to only those columns which need the larger sample.

Based on all of the foregoing, it would be desirable for improved techniques for deriving database statistics.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF INVENTION

In an embodiment of the present invention, base synopses are generated. Each base synopsis summarizes a statistic for a portion of a table, and contains values for a respective region of a domain of values. The base synopses are merged to generate a merged synopsis. The merging is based on an intersection of the respective region of domain of values defined for each base synopsis. For each value that is in a base synopsis and in the intersection, the value is added to the merged synopsis if the value does not exist there already. Based on the number of values in the merged synopsis and the size of intersection, the statistic is estimated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram illustrating merging synopses, in accordance with an embodiment of the present invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Approximate NDV

Techniques for approximating database statistics are disclosed herein. In one embodiment, the statistic that is approximated is the number of distinct values (NDV) in a portion of a database table. As used herein, the term "portion" includes all or any part of whatever the term "portion" modifies. Thus, the portion can be the entire table, a partition, or a portion of the table that is not a partition. For purposes of illustration, the statistic that is discussed will be NDV. However, the statistic is not limited to being the NDV. To estimate the NDV, for each column whose NDV are to be estimated ("the target column"), a set of distinct values of this column is built up from a single scan of a portion of a table, in one embodiment. This set of distinct values is referred to as a "synopsis."

Figure 1:
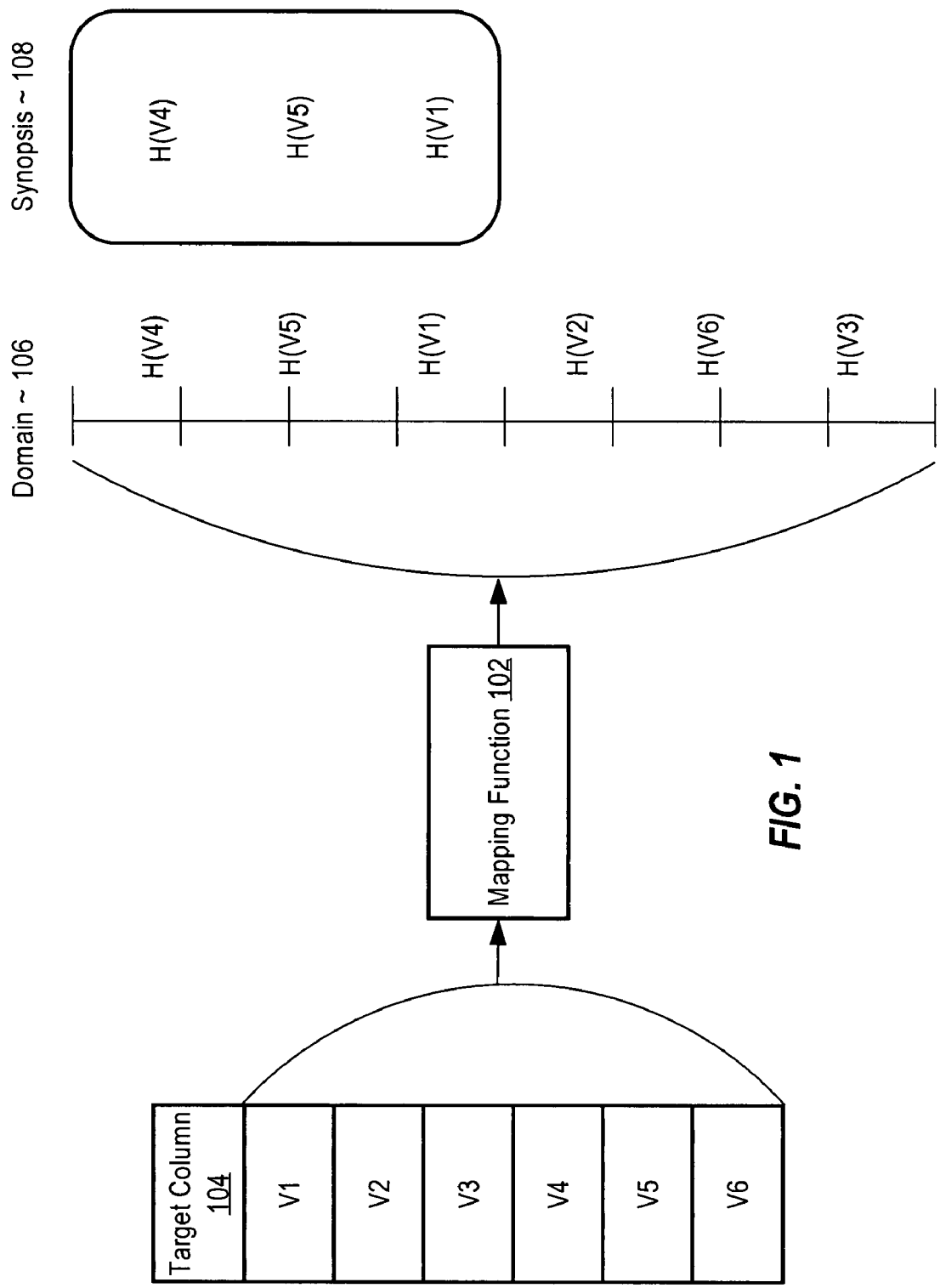
FIG. 1 is a block diagram illustrating approximating a database statistic by generating a synopsis, in accordance with an embodiment of the present invention.

Referring to FIG. 1, to construct the synopsis 108, each value in the target column 104 is mapped to a domain 106 of values using a mapping function 102. The mapping function 102 is implemented with a uniform hash function, in one embodiment. If the resultant domain value does not exist in the synopsis 108, the domain value is added to the synopsis 108. The synopsis 108 has a finite size and may not be able to hold as many unique values as there are possible based on the size of the domain 106. For example, the domain 106 might have a range of $2^{64}$ unique values, but the synopsis 108 might only be able to hold about 10,000 unique values. Therefore, when the synopsis 108 reaches its capacity, a portion of the domain values are discarded from the synopsis 108. Discarding the domain values is achieved by "splitting the synopsis," in one embodiment. In FIG. 1, the synopsis 108 has been split once as is illustrated by the synopsis 108 only containing domain values that are in the upper half of the range of domain values.

The procedure continues until all values in the target column 102 have been processed. When all values in the target column 102 have been processed, the NDV in the target column 102 is approximated based on the number (N) of domain values in the synopsis 108 and the portion of the domain that is represented in the synopsis 108 relative to the size of the domain 106. For example, since the synopsis 108 represents half of the domain values, the NDV is approximately $3*2$. In one embodiment, each splitting divides the synopsis 108 in half. If the number of splits is represented by (i), then the NDV in the target column 102 is approximately $N*2^i$.

Synopsis

As used herein, the term "synopsis" means a data structure that summarizes a portion of a table in such a way that allows estimation of what is in the portion of the table. For example, a synopsis 108 may contain a summary that allows estimation of the NDV for the portion of the table. The portion could be a partition, but is not limited to being a partition. The synopsis 108 can be used to gather statistics on a partitioned table, a non-partitioned table, or any portion of a table that is not a partition.

Note that the domain values that are stored in the synopsis 108 are not the table values. The individual table values themselves could require a substantial amount of memory to store. Further, the size of the different table values could be quite different from each other. As previously mentioned, the domain values are hash values in one embodiment, which reduces memory requirements.

In one embodiment, the statistics in two or more synopses 108 are merged to generate a merged synopsis 108. For example, if a table has "n" partitions, then "n" synopses 108 are merged to determine statistics for the entire table. In one embodiment, the synopses 108 are used to perform incremental maintenance of a database statistic.

Uniform Hash Function

A synopsis 108 is generated by mapping each column value to a domain value. In one embodiment, the mapping is performed by hashing column values with a uniform hash function. A uniform hash function has the property that each column value has an approximately equal probability of mapping to any domain value. Stated another way, mapping the table values results in a substantially even distribution of domain values across the domain 106.

The following discussion illustrates properties of a uniform hash function that is used in accordance with one embodiment. Suppose the target column 104 in a table contains "n" rows and therefore has "n" values $a_1, a_2, \ldots a_n$. Some, or even all, of the table values may be duplicates. The following are properties of a uniform hash function that used to map table values to a domain 106, in an embodiment:

For each value as, the uniform hash function $h(a_i)$ generates a list of k bits. The k bits are denoted as $h_{i1}, h_{i2} \ldots, h_{ik}$.

For any $j \in (1, k)$, $h_{ij}$ has an equal probability of being 0 or 1.

All kit bits are independent, which means the value of $h_{ij}$ has no dependence on the value of $h_{i'j'}$ unless $a_i = a_{i'}$ and $j = j'$.

Because hash values are stored in the synopsis 108, instead of the actual values in the target column 104, and because hash values may have conflicts (different values are hashed to the same domain values), the NDV for the target column 104 is an approximate value. This approximate value may be lower than the actual NDV in the target column 104. To prevent a large error in the estimate, a large number of bits can be used for each hash value. In one embodiment, k=64. However, k may be a larger or a smaller number.

In one embodiment, splitting the synopsis 108 is achieved by discarding all hash values for which any of the leading "i" bits are "1," where "i" corresponds to the number of times the synopsis 108 has been split. Thus, the ith time splitting occurs, only hash values in the synopsis 108 that have a prefix of i zeroes are kept. After splitting the synopsis 108, when mapping the next value in the target column 104, the domain value is not added to the synopsis 108 if any of its leading "i" bits are one. Thus, after the ith splitting, only those domain values that start with a prefix of i zeroes can be added into the synopsis 108. Clearly, the splitting can be performed in another way. As an alternative, after the ith time splitting occurs, only hash values in the synopsis 108 that have a prefix of i ones might be kept.

Procedure Overview of Approximating NDV

Figure 2:
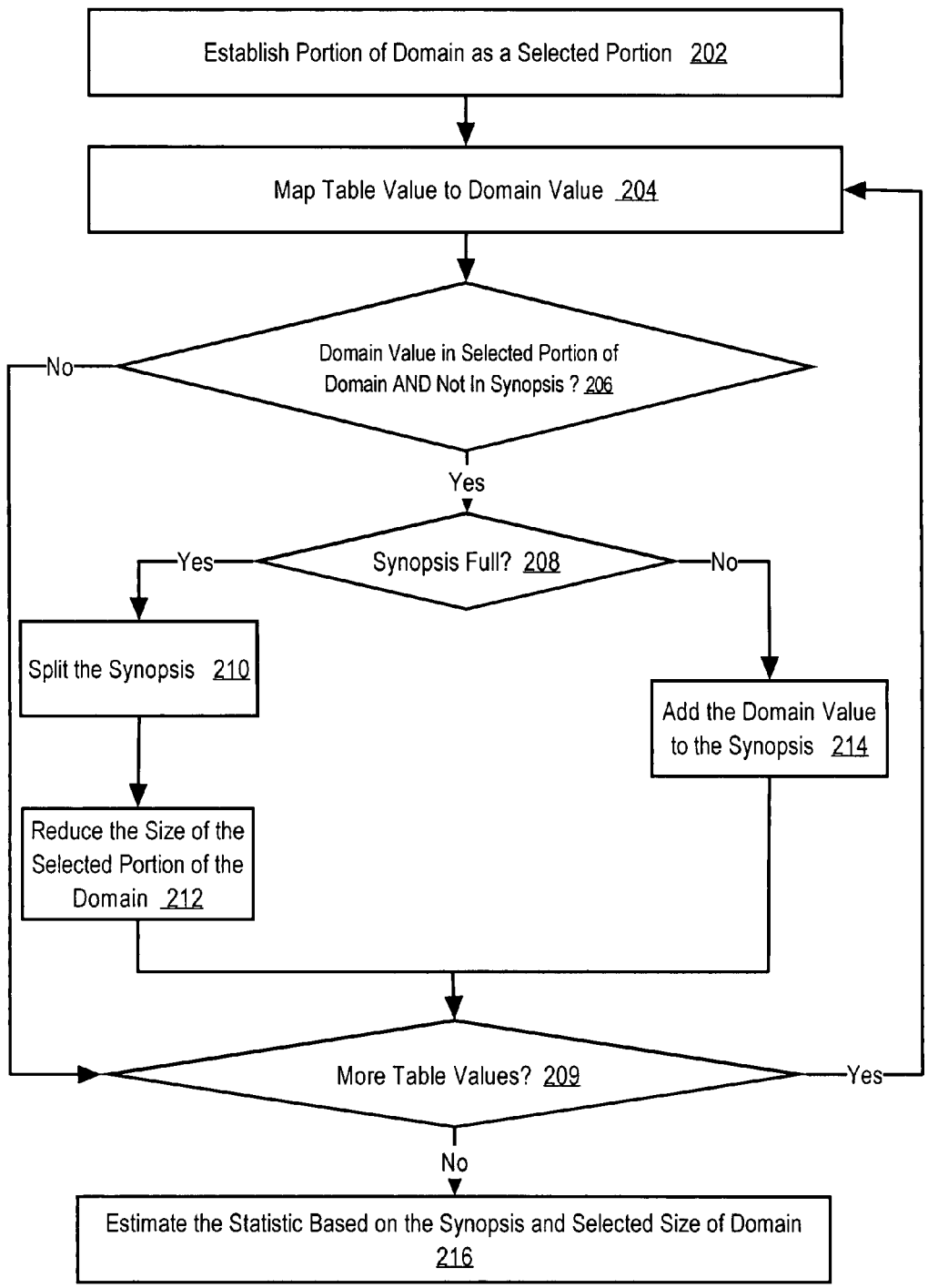
FIG. 2 is a flowchart illustrating a procedure of approximating a statistic for a portion of a table, in accordance with an embodiment of the present invention.

FIG. 2 is a flowchart illustrating steps of a procedure 200 of estimating a statistic for a portion of a table, in accordance with an embodiment of the present invention. Procedure 200 is used to create a synopsis 108 that summarizes the statistic for a portion of the table. As previously discussed the portion can be a partition, the entire table, or a portion that is not a partition. For purpose of discussion, in procedure 200 the portion will be referred to as a target column 104. It will be understood that the portion could be only some rows of the target column, or could even include multiple columns. Initially, the synopsis 108 is an empty set.

In step 202, a portion of a domain 106 is established as a selected portion. The reason for selecting a portion of the domain 106 is that only values in the selected portion are added to the synopsis 108. The selected portion of the domain 106 is reduced if the synopsis 108 reaches its capacity. Typically, the entire domain 106 is initially established as the selected portion, although that is not required. For purposes of illustration, the domain 106 of values are hash values that are generated by a uniform hash function. For example, if a 64-bit uniform hash function is used, then all hash values may be established as the initial selected portion of the domain 106. After the first splitting, only hash values whose leading bit is "0" are considered to be in the selected portion of the domain.

In step 204, a table value from the target column 104 is mapped to a domain value. For example, a value from the target column 104 is hashed with the uniform hash function, resulting in a hash value somewhere in the domain 106.

In step 206, the domain value is tested to determine whether the domain value is in the selected portion of the domain 106 and is not in the synopsis 108. For example, initially all 64-bits of the hash value are established as the selected portion of the domain 106. However, a later step (step 212) may reduce the size of the selected portion. If the hash value is not in the selected portion, then control passes to step 204 to map another table value to a domain value. Also, if the domain value is already in the synopsis 108, then control passes to step 204 to map another table value to a domain value.

If the conditional of step 206 evaluates to true, then it is determined whether the synopsis 108 is full, in step 208. If the synopsis 108 is full, then the synopsis 108 is split, in step 210. Splitting the synopsis 108 can be achieved by discarding a portion of the hash values from the synopsis 108. For example, the synopsis 108 is split in half by discarding all hash values that have a one in any of their leading "i" bits, wherein "i" is the number of times the synopsis 108 was split, in one embodiment. Thus, the first time that the synopsis 108 is split all hash values having a "1" as the first leading bit are discarded, the second time that the synopsis 108 is split all hash values having a "1" in the second leading bit are discarded, etc.

In step 212, the selected portion of the domain 106 is reduced in size. For example, if the domain 106 formerly included $2^{64}$ unique hash values, then only $2^{63}$ hash values are included in the new selected portion of the domain 106. This is achieved by considering hash values having a "1" in any of their leading "i" bits as being outside of the selected portion of the domain 106, in one embodiment. Thus, the first time that the domain 106 is reduced in size all hash values starting with a "1" are outside of the new selected portion of domain 106, the second time that the domain 106 is reduced in size all hash values having a "1" in either of the first two bits are outside of the selected portion of domain 106, etc. Note that re-sizing the selected portion of the domain 106 results in the selected portion of domain 106 having a range of hash values that covers the hash values kept in the synopsis 108.

If the conditional of step 206 evaluates to false, then the domain value is added to the synopsis 108, in step 214. That is, if the synopsis 108 is not full and if the domain value is in the selected portion of the domain 106, the domain value is added to the synopsis 108.

After steps 212 or 214, if there are more table values as determined by step 209, control passes to step 204. When there are no more table values to process, control passes to step 216 to estimate the statistic. The statistic is estimated based on the number of unique domain values in the synopsis 108, along with the size of the domain 106 relative to the domain's full size. In an embodiment in which the synopsis 108 and the domain 106 are each always split in half when the synopsis 108 is full, the statistic is estimated according to the formula in Equation 1:

$$NDV \approx N*2^i \qquad \text{Equation 1}$$

In Equation 1, "N" is the number of distinct values in the synopsis 108 and "i" is the number of times that the synopsis 108 was split in half. However, while splitting in half is convenient, it is not required that the splitting of the synopsis 108 always be exactly in half.

Example Pseudocode for Approximating NDV

Table I contains example commented pseudocode for approximating an NDV for a target portion of a table. This example pseudocode approximates an NDV for a target column 104 using a uniform hash function (h). Each time the synopsis 108 is split, it is split exactly in half, in this example.

The splitting parameter (d) is used to track how many times the synopsis 108 has been split.

TABLE I

```
{initialize the synopsis as the empty set}
S = 0
{initialize the splitting parameter as 0}
d = 0
{scan and process each table value in the target column}
    for each column value a_i do
{generate the hash value of the table value}
    h_i = hash(a_i) where hi = h_{i1}, ..., h_{ik}
{if the hash value is in the selected portion of the domain and not in the synopsis}
    while h_{i1} = ... = h_{id} = 0 and h_i is not an element of S do
{if the synopsis has reached its capacity, then increment the splitting parameter and remove hash values from the synopsis, else add the hash value to synopsis}
        if |S| = N then
            d = d + 1
            delete from S all h_j such that h_{jd} = 1.
        else
            add h_i to S
        end if
    end while
    end for
{NDV is the number of values in the synopsis times 2 raised to the power of number of splits}
return 2^d · |S|
```

Operational Example of Approximating NDV

The following operation example is provided for the purpose of illustrating how procedure 200, the example pseudocode of TABLE I, or variations thereof, might be applied to estimate the NDV in a target column 104 having seven rows (R1-R7). In this example, for ease of illustration, the hash value contains four bits and the capacity of the synopsis 108 is three (in practice, the number of bits and the capacity of the synopsis are larger).

The first column in the TABLE II lists each row that is scanned. The rows are scanned from R1 to R7 in this example. The second column in the TABLE II shows the hash values for the corresponding row value. The third column shows the contents of the synopsis 108 after that row has been scanned. The fourth column shows the number of times the synopsis 108 has been split at the time the corresponding row was scanned.

TABLE II

| Row Number | Hash Value of Row Value | Synopsis Content | Number of Splits |
|---|---|---|---|
| R1 | 1101 | {1101} | 0 |
| R2 | 1101 | {1101} | 0 |
| R3 | 0011 | {1101, 0011} | 0 |
| R4 | 0001 | {1101, 0011, 0001} | 0 |
| R5 | 0101 | {0011, 0111, 0101} | 1 |
| R6 | 1001 | {0011, 0001, 0101} | 1 |
| R7 | 0111 | {0011, 0111} | 2 |

When R1 is scanned, its hash value of "1101" is added to the synopsis 108. When R2 is scanned, since the hash value of R2 is already in the synopsis 108, the duplicate hash value "1101" is not added to the synopsis 108. When rows R3 and R4 are scanned, their hash values are added to the synopsis 108 because they are not in the synopsis 108.

When row R5 is scanned, the hash value "0101" is not in the synopsis 108 and therefore should to be added to the synopsis 108. However at this point, the synopsis 108 has reached its capacity of three. In order to accept this new value, the synopsis 108 is split. To split the synopsis 108, all hash values that start with a "1" are discarded. Thus, "1101" is thrown away and the hash value of R5 is added into the synopsis 108. After the synopsis 108 is split, hash values that start with a "1" are not added to the synopsis 108. In other words, the size of the selected portion of domain 106 is reduced.

When row R6 is scanned, its hash value of "1001" is not added to the synopsis 108 because it has a leading "1." In other words, the hash value "1001" is outside of the selected portion of the domain 106.

When R7 is scanned it is determined that its hash value "0111" is both within the selected portion of domain 106 and not in the synopsis 108. Therefore, it should be added to the synopsis 108. However, the synopsis 108 is full. Therefore, all hash values whose second leading bit is "1" are discarded from the synopsis 108. Because all hash values whose first leading bit was "1" were already discarded, the net result is that all hash values with either the first or second bit of "1" are discarded. In other words, only those hash values whose two leading bits are "0" are retained in the synopsis 108.

Note that splitting the synopsis 108 reduced the size of the selected portion of the domain 106. Thus, even though there is room for the hash value "0111" of row R7 in the synopsis 108, it is not added because it is outside of the new selected portion of the domain 106. That it, because this hash value does not fit the criteria of having its two leading bits being "0", it is not added to the synopsis 108.

When all rows have been processed, the estimate for the NDV in the target column 104 is made. In this example, there are two hash values in the synopsis 108 and there were two splits. Therefore, based on Equation 1, the NDV $2 * 2^2 = 8$.

It will be borne in mind, that the above example is one way in which the NDV could be estimated. However, variations are possible.

Overview of Merging Synopses

After a synopsis 108 is generated for portions of the table, the synopses 108 can be merged to derive a statistic, such as NDV. The merging can be used to determine an initial database statistic or to perform incremental statistics maintenance. FIG. 3 illustrates three synopses 108*a*, 108*b*, and 108*c* merged to a single merged synopsis 108*m*. Each synopsis 108*a-c* corresponds to a different database partition, in one embodiment. However, each synopsis 108*a-c* could represent a portion of the table other than a partition.

Prior to merging the synopses 108*a-c*, the data in each synopsis 108 is made compatible with the data in the other synopses 108*a-c*, in this embodiment. One condition for data compatibility is to use the same uniform hash function when processing column values to generate each synopsis 108*a-c*. However, the various synopses 108*a-c* may have been split a different number of times. Because splitting a synopsis 108 reduces the domain values represented in the synopsis 108, an adjustment is made such that each synopsis 108 represents the same range of domain values, in one embodiment. The adjustment is achieved by further splitting until each synopsis 108 has been split the same number of times.

For example, synopsis 108*b* was split twice and thus only includes values from ¼ of the domain 106. Therefore, the other synopses 108*a* and 108*c* are split until they include values from the same ¼ of the domain 106. This is represented in FIG. 3 by splitting synopsis 108*a* once to generate synopsis 108*a'* and splitting synopsis 108*c* twice to generate synopsis 108*c'*.

After the synopses 108a and 108c have been split to form three "compatible synopses" 108a', 108b, and 108c', the union of the three compatible synopses 108a', 108b, and 108c' is determined to generate the merged synopsis 108m. It is not required that the merged synopsis 108m include all values from the three compatible synopses 108a', 108b, and 108c'. For example, if the capacity of the merged synopsis 108m is exceeded, then the merged synopsis 108m itself can be split such that it represents a smaller portion of the domain 106.

Merging of the synopses 108 is used to determine a global statistic by merging synopses 108a-c for different portions (e.g., partitions) of a table, in one embodiment. The synopses 108a-c for the different portions are generated by parallel processing in one embodiment. Thus, parallel processing is used in the determination of the global statistic.

The synopses 108a-c that are merged do not need to be determined in parallel. For example, a newly generated synopsis 108 is merged with one or more previously generated synopses 108, in one embodiment. For example, if a new partition is added to a table, a new synopsis 108 can be generated for that partition. As another example, if a partition is changed, a synopsis 108 for that partition can be updated. Updating a synopsis 108 is achieved by discarding the former synopsis 108 and generating a new synopsis 108 by scanning all the rows in the changed partition, in one embodiment. If there are previously generated synopses 108 for unchanged partitions, the new or updated synopses 108 can be merged with the previously generated synopses 108 for unchanged partitions. Thus, a global statistic is incrementally updated without requiring that statistics be re-gathered for each partition in the table.

Procedure Overview of Merging Synopses

Figure 4:
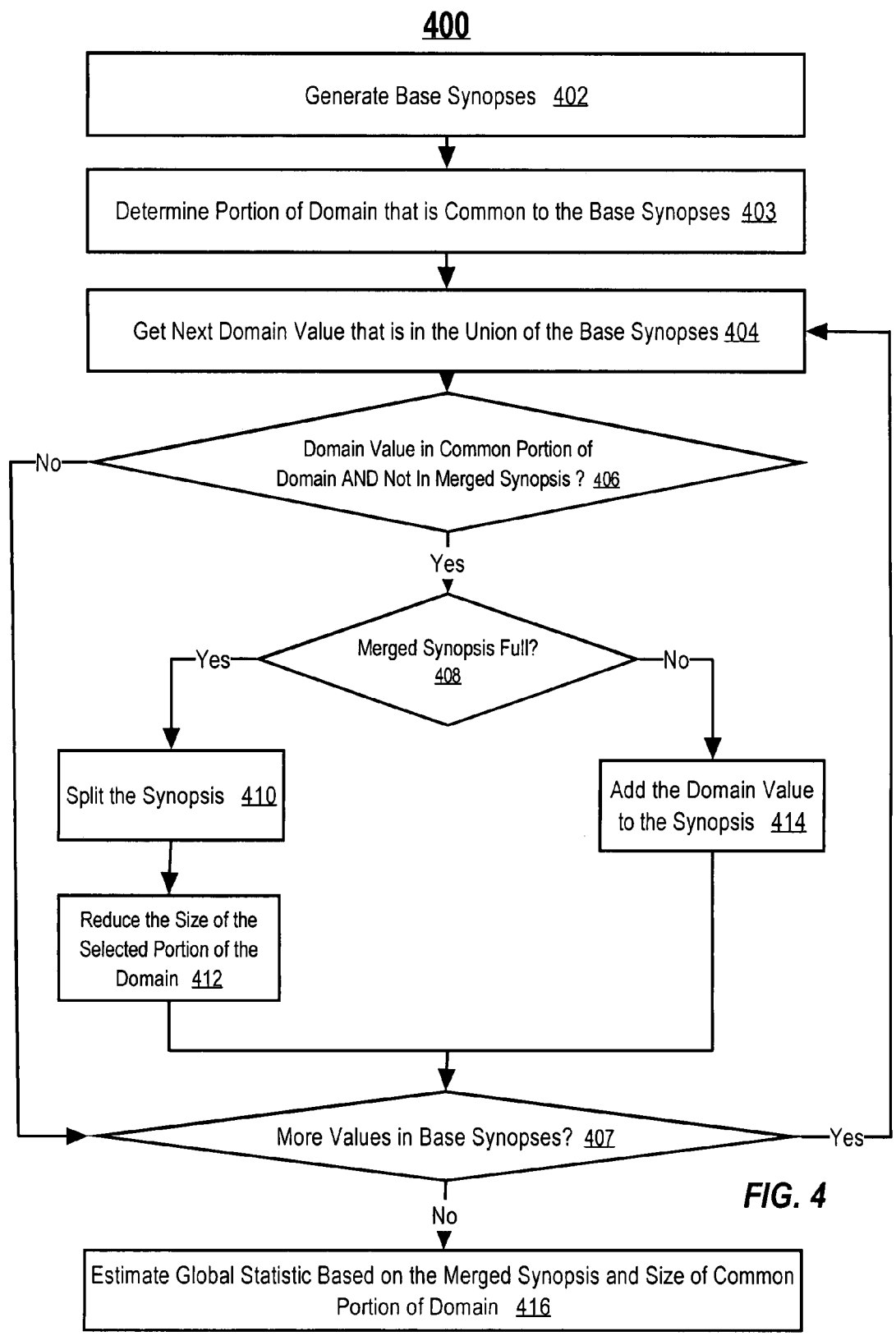
FIG. 4 is a flowchart illustrating a procedure of merging synopses, in accordance with an embodiment of the present invention.

FIG. 4 is a flowchart illustrating steps of a procedure 400 of merging synopses 108, in accordance with an embodiment of the present invention. In step 402, a number of synopses 108 are generated. In one embodiment, the base synopses 108 are generated in parallel. Each synopsis 108 ("base synopsis") summarizes a statistic for a portion of a database. Further, each base synopsis 108 contains values for a portion of a domain 106. For example, one synopsis 108 might contain values representing ¼ of the domain 106, while another contains domain values representing ½ of the domain 106. The base synopses 108 are generated in accordance with procedure 200, in one embodiment. However, step 402 is not limited to procedure 200. Further, step 402 is not limited to techniques described herein.

In one embodiment, the base synopses 108 may be generated by any technique that creates a synopsis 108 that summarizes a database statistic for a portion of a table, provided that the synopses 108 are mergeable. A set of synopses 108 that represent a statistic for a corresponding set of portions of a table are mergeable if the merged synopsis generated from the set of synopses 108 by a particular technique is substantially the same as a single synopsis 108 created by the particular technique directly from all portions in the set of portions.

In step 403, a portion of a domain 106 that is common to each of the base synopses 108 is determined. In one embodiment, each time a base synopsis 108 is split, one half of the domain values are discarded. Further, there is an ordered sequence in which domain values are discarded. For example, hash values whose leading "i" bits are not equal to "0" are discarded, where "i" is the number of splits. Discarding in an ordered sequence results in the common portion of the domain 106 being the portion of the domain 106 represented by the base synopsis 108 that was split the greatest number of times. However, it is not required that the base synopses 108 are generated by discarding the domain values in an ordered sequence. As such, the common portion of the domain 106 is not limited to the example in which domain values are discarded in an ordered sequence.

In step 404, the next domain value that is in the union of the base synopses 108 is determined. Steps 406-414 process that domain value to determine whether it should be added to the merged synopsis 108.

In step 406, the domain value is tested to determine whether the domain value is in the common portion of the domain 106 and is not in the merged synopsis 108. If the domain value is not in the common portion of the domain 106, then control passes to step 407 to determine whether there are any more values in the base synopses 108 to process. Also, if the domain value is already in the merged synopsis 108, then control passes to step 407 to determine whether there are any more values in the base synopses 108 to process.

If the conditional of step 406 evaluates to true, then it is determined whether the merged synopsis 108 is full, in step 408. If the merged synopsis 108 is full then the merged synopsis 108 is split, in step 410. Splitting the merged synopsis 108 can be achieved by discarding a portion of the domain values from the merged synopsis 108. For example, the merged synopsis 108 is split in half by discarding all hash values having a "1" in any of the leading "i" bits, wherein "i" is the number of time the merged synopsis 108 was split, in one embodiment. Thus, the first time that the merged synopsis 108 is split all hash values starting with a "1" are discarded, the second time that the merged synopsis 108 is split all hash values having a second bit of "1" are discarded, etc.

In step 412, the selected portion of the domain 106 is reduced in size. For example, if the domain 106 formally included $2^{64}$ unique hash values, then only $2^{63}$ hash values are included in the new selected portion of the domain 106. This is achieved by considering hash values having a "1" in any of the leading "i" bits as being outside of the selected portion of the domain 106, in one embodiment. Note that re-sizing the selected portion of the domain 106 results in the new selected portion of domain 106 having a range of hash values that covers the hash values kept in the merged synopsis 108.

If the conditional of step 406 evaluates to false, then the domain value is added to the merged synopsis 108, in step 414. That is, if the merged synopsis 108 is not full and if the domain value is in the selected portion of the domain 106, the domain value is added to the merged synopsis 108.

After steps 412 or 414, if there are more table values, as determined by step 409, then control passes to step 404. When there are no more table values to process, control passes to step 416 to estimate the statistic. The statistic is estimated based on the number of unique domain values in the merged synopsis 108, along with the size of the domain 106 relative to the domain's original size. In an embodiment in which the merged synopsis 108 and the domain 106 are each always split in half when the merged synopsis 108 is full, the statistic is estimated according to the following formula in Equation 1:

$$N*2^i.\qquad\text{Equation 1}$$

In Equation 1, "N" is the number of distinct values in the merged synopsis 108 and "i" is the number of times that the merged synopsis 108 (and therefore domain 106) was split in half. However, while splitting in half is convenient, it is not required that the splitting of the merged synopsis 108 always be exactly in half.

Incremental Maintenance of Global NDV

As changes are made to the portion of the table that a particular synopsis 108 summarizes, that particular synopsis 108 will become less accurate. The merged synopsis 108 could be recreated from scratch to reflect the changes to that portion of the table. However, rather than re-constructing the merged synopsis 108 from scratch, incremental maintenance of the merged synopsis 108 is performed, in accordance with an embodiment of the present invention.

Figure 5:
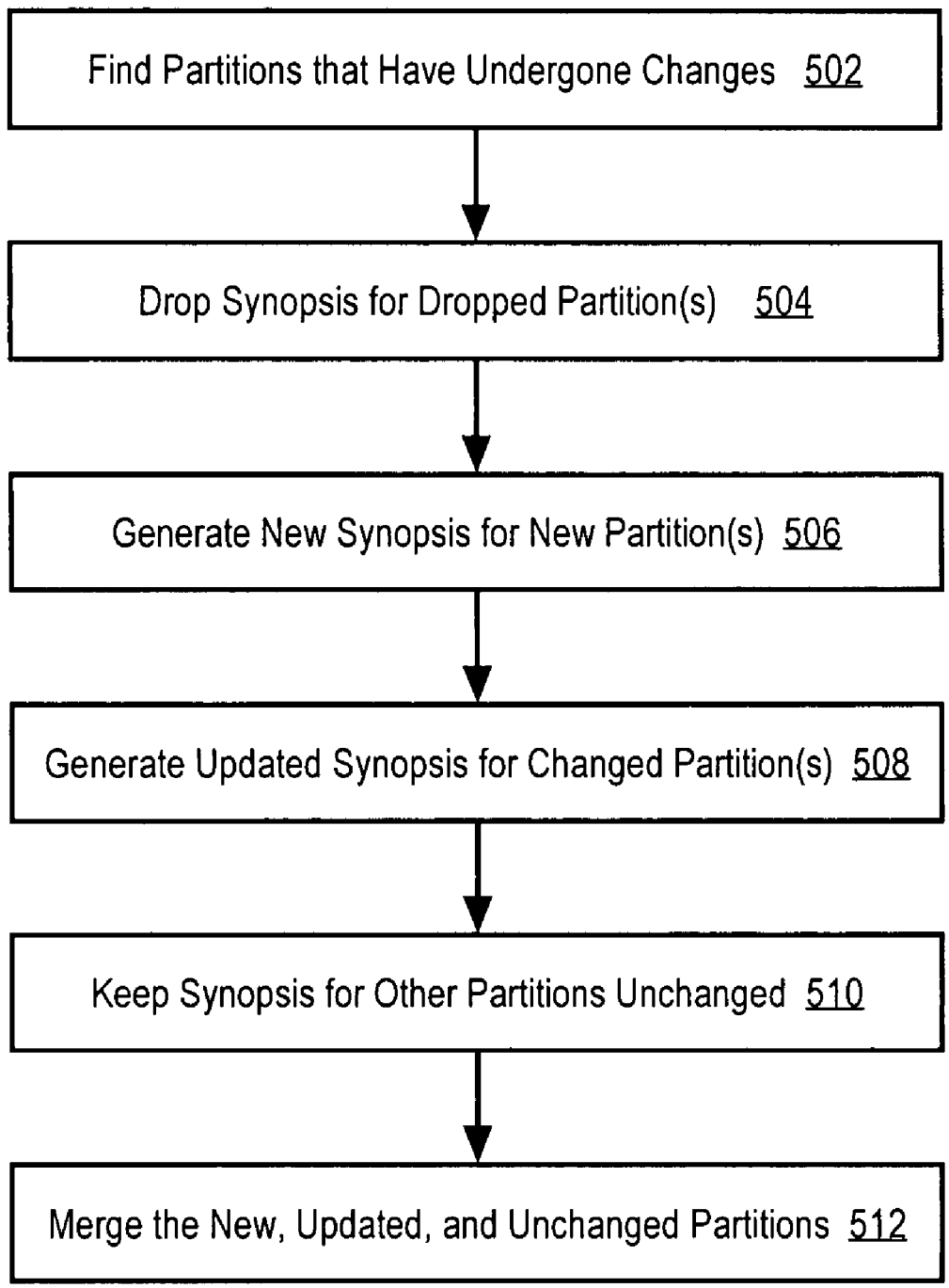
FIG. 5 illustrates a procedure for incremental maintenance of a database statistic, in accordance with an embodiment of the present invention.

FIG. 5 illustrates a procedure 500 for incremental maintenance of a database statistic, in accordance with an embodiment of the present invention. In step 502, all the partitions that have undergone changes are determined. In one embodiment, procedure 500 looks for data definition language (DDL) changes affecting the table. The changes can include various partition DDL operations such as adding, dropping, coalescing, merging and splitting partitions etc. Each of these operations can be viewed as a composition of dropping a partition and adding a partition. For example, splitting a large partition P into smaller partitions P1 and P2 can be viewed as dropping partition P and adding new partitions P1 and P2.

In step 504, the synopsis 108 corresponding to any dropped partition is itself deleted. In step 506, a new synopsis 108 is generated for those partitions that have been newly added. Each new synopsis 108 can be generated by applying procedure 200 to each new partition. However, the synopses 108 can be generated by a technique other than procedure 200.

In step 508, an updated synopsis 108 is generated for all previously existing partitions that have undergone significant data changes. As an example, a significant change might be considered to be a change (delete, insert or update) to 10% of the rows in the partition. However, a different criterion might be used to define a significant change. For all those significantly changed partitions, procedure 500 re-gathers their statistics, in one embodiment. For example, procedure 200 can be performed on each changed partition. After step 508, all synopses 108 of the partitions are up-to-date. The synopsis 108 for any unchanged partitions are kept, as indicated by step 510.

In step 512, the new, updated and unchanged synopses 108 are merged. Thus, the global statistic is incrementally maintained. Merging the synopses 108 is performed as in procedure 400, in one embodiment.

Example Pseudocode for Deriving Global NDV

TABLE III contains example commented pseudocode for determining a global NDV based on two or more synopses 108. The merged synopsis 108 may be for any portion of a table. The generation of the M base synopses 108 may be performed in parallel; however, parallel generation is not required.

TABLE III

{Divide the data into M parts and generate M base synopses}
{initialize the merged synopsis as the empty set}
S= 0
{initialize the splitting parameter as the maximum times any of the base synopses were split}
d = max {d1, d2, ...dm}
{for each domain value in the union of all of the base synopses }
  for $h_i$ is an element of $S_1 \cup S_2 \cup ... \cup S_m$ do TABLE III-continued {if the domain value is in the common portion of the domain and is not in the merged synopsis }
    while $h_{i1} = ... = h_{id} = 0$ and $h_i$ is not an element of S do
    {if the merged synopsis has reached its capacity, then increment the splitting parameter and remove domain values from the merged synopsis, else add the domain value to merged synopsis}
      if |S| = N then
        d = d + 1
        delete from S all $h_j$ such that $h_{jd} = 1$.
      else
        add $h_i$ to S
      end if
    end while
  end for
{global NDV is the number of values in the merged synopsis 108 times 2 to the power of number of splits}
return $2^d \cdot |S|$ The example pseudocode in TABLE III indicates that the data is divided into M parts for which corresponding M base synopses 108 are generated. Procedure 200 is used to generate the base synopses, in one embodiment. The base synopses 108 are generated in accordance with the example pseudocode of TABLE I, in one embodiment.

Applying the pseudocode of TABLE III for deriving global NDV from multiple base synopses 108 generates the same result as applying the example pseudocode of TABLE I to the entire table without first generating multiple base synopsis 108.

Operational Example of Merging Synopses

In the following example, two synopses 108 are merged together. However, any number of synopses 108 can be merged. The synopses 108 can be generated with techniques described herein. For example, procedure 200 can be used to generate the synopses 108. However, the synopses 108 themselves can be generated by other techniques, included those not described herein.

In this example, the first synopsis 108 contains {0011, 0001} and has been split twice. Thus, it includes hash values from one fourth of the original domain 106. The second synopsis 108 contains the hash values {0001, 0000} and has been split three times. Thus, it contains hash values for one eighth of the original domain 106.

The first synopsis 108 is split one additional time, such that both synopses 108 will have undergone three splits. For this third split, all hash values that do not start with three zeroes are discarded from the synopsis 108. Thus, the hash value "0011" is discarded, leaving the synopsis 108 with the hash value {0001}.

Next the union of the two synopses 108 is formed. Thus, the merge of {0001} with {0001, 0000} produces the merged synopsis 108 {0001, 0000}. This merged synopsis 108 contains approximately ⅛ of the distinct values in the whole table. The NDV of the table is calculated by the formula in Equation 1. Therefore, the global NDV=2*23=16.

Granularity of Synopsis Maintenance

As previously discussed, the synopses 108 may be maintained at the partition level. However, the synopses 108 may be maintained at a higher granularity than partition level. For example, a single synopsis 108 may summarize a statistic for a group of partitions. In one embodiment, a single synopsis 108 summarizes a statistic for a group of partitions that are not updatable. This might be the case if only one partition in a partitioned table is updatable, which is quite common for tables that are partitioned on date. For example, if a sales table is partitioned on the date of sales, then those partitions on the past months will no longer be changed. Only the partition containing the sale records in the current month will have new entries. For such a table, all the partitions that are not updatable are grouped, wherein a single synopses 108 is maintained for them as if they were one large partition. The updateable partition has its own synopsis 108, in this embodiment. Having a single synopsis 108 for the group of not updatable partitions can significantly reduce the space required to store synopses 108 and the time required to aggregate synopses 108.

Choosing Target Columns

Suppose a partition has two columns c1 and c2 and that a synopsis 108 is created for c1 but not c2. Assume further that later another partition has changed; therefore, requiring an update to the statistics of c1 and c2. Since there is no synopsis 108 for c2, all of the partitions would need to be scanned to determine the NDV for c2. In other words, given a set of columns whose NDV are needed, incremental maintenance of a subset of these columns does not avoid the scanning of unchanged partitions. For this reason, in one embodiment, a synopsis 108 is created for each column in the table.

Another embodiment analyzes the workload and discovers those columns whose NDV are truly needed and creates synopses 108 only for those columns. For example, synopses 108 are created for columns that are involved in joins. Therefore, synopsis maintenance cost and the disk space usage can be reduced.

Tracking Occurrence of Each Distinct Value in Synopsis

In one embodiment, a count is kept the in the synopsis 108 of the number of occurrences of each particular domain value. Therefore, each time a domain value is processed, if that domain value is already in the synopsis 108, then a count of the number of occurrences for the domain value is incremented. When changes are made to the table and statistics are re-gathered for the synopsis 108, the count can be decremented or incremented as necessary to reflect the changes.

Hardware Overview

Figure 6:
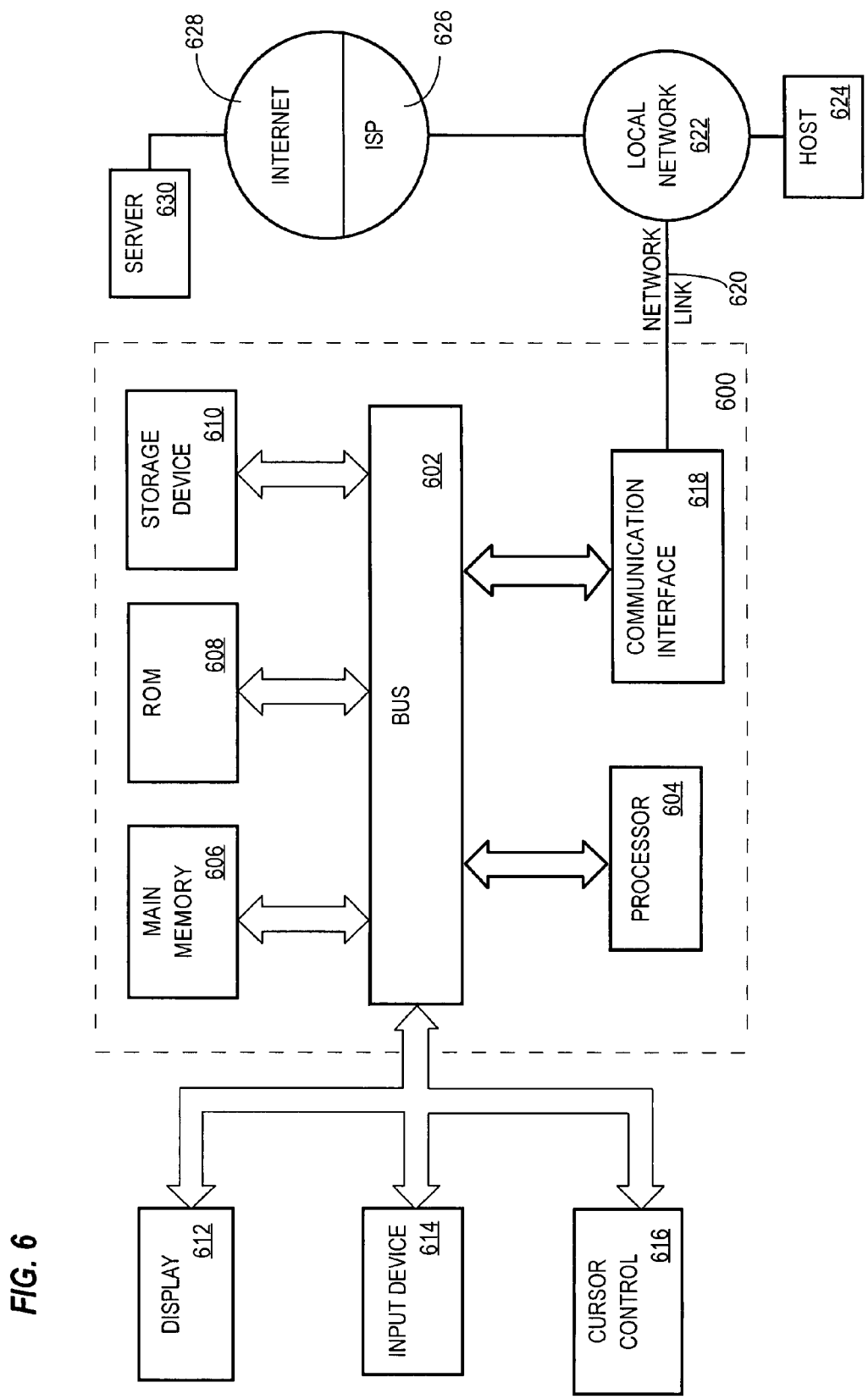
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the procedure steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method comprising:
    merging a plurality of base synopses to generate a merged synopsis, wherein each base synopsis summarizes a statistic for a portion of a table, and wherein each base synopsis contains values for a respective defined region of a domain of values, wherein the merging includes performing the following:
        for each value that is any of the plurality of base synopses and is in a intersection of the respective defined regions, if the value does not exist in the merged synopsis, adding the value to the merged synopsis;
    after merging the plurality of base synopses to generate the merged synopsis, estimating the statistic based on a number of values in the merged synopsis and a size of the intersection of the respective defined regions relative to a size of the domain; and
    wherein the method is performed by one or more computing devices.

2. The method of claim 1, further comprising:
    while merging the plurality of base synopses, if the number of values in the merged synopsis exceeds a threshold number of values:
        selecting a subset of the intersection of the respective defined regions; and
        removing values from the merged synopsis that are outside of the subset.

3. The method of claim 1, further comprising generating each of the base synopses in parallel.

4. The method of claim 1, further comprising:
    analyzing the table for changes;
    based on the changes, performing at least one of:
        generating a new synopsis for a portion of the table; or
        discarding the synopsis for a portion of the table; and
    performing the merging and estimating steps on the new synopsis and any synopses that were not discarded.

5. The method of claim 4, further comprising generating a new synopsis for each new portion of the table.

6. The method of claim 4, further comprising discarding the synopsis for each portion of the table that was deleted.

7. The method of claim 4, further comprising replacing the synopsis for each portion of the table that was changed with an updated synopsis.

8. The method of claim 4, further comprising retaining the synopsis for each portion of the table that was unchanged.

9. The method of claim 1, wherein each base synopsis summarizes the statistic for a different portion of the table, and wherein estimating the statistic generates the statistic for the combination of the portions of the table.

10. The method of claim 1, wherein each base synopsis summarizes the statistic for a different partition of the table.

11. A computer readable storage medium storing instructions which, when executed on a processor, cause the processor to perform the steps of:
    merging a plurality of base synopses to generate a merged synopsis, wherein each base synopsis summarizes a statistic for a portion of a table, and wherein each base synopsis contains values for a respective defined region of a domain of values, wherein the merging includes performing the following:
        for each value that is any of the plurality of base synopses and is in a intersection of the respective defined regions, if the value does not exist in the merged synopsis, adding the value to the merged synopsis; and
    after merging the plurality of base synopses to generate the merged synopsis, estimating the statistic based on a number of values in the merged synopsis and the size of a intersection of the respective defined regions relative to a size of the domain.

12. The computer readable storage medium of claim 11, wherein the instructions which, when executed on a processor, cause the processor to perform the step of merging the plurality of base synopses comprise instructions which, when executed on the processor, cause the processor to perform the step of determining whether the number of values in the merged synopsis exceeds a threshold number of values; and further comprising instructions which, when executed on the processor, cause the processor to perform the steps of:

in response to the determining that the number of values in the merged synopsis exceeds the threshold number of values:

selecting a subset of the intersection of the respective defined regions; and removing values from the merged synopsis that are outside of the subset.

13. The computer readable storage medium of claim 11, further comprising instructions which, when executed on the processor, cause the processor to perform the steps of generating each of the base synopses in parallel.

14. The computer readable storage medium of claim 11, further comprising instructions which, when executed on the processor, cause the processor to perform the steps of:

analyzing the table for changes;

based on the changes, performing at least one of:

generating a new synopsis for a portion of the table; or discarding the synopsis for a portion of the table; and performing the merging and estimating steps on the new synopsis and any synopses that were not discarded.

15. The computer readable storage medium of claim 14, further comprising instructions which, when executed on the processor, cause the processor to perform the steps of generating a new synopsis for each new portion of the table.

16. The computer readable storage medium of claim 14, further comprising instructions which, when executed on the processor, cause the processor to perform the steps of discarding the synopsis for each portion of the table that was deleted.

17. The computer readable storage medium of claim 14, further comprising instructions which, when executed on the processor, cause the processor to perform the steps of replacing the synopsis for each portion of the table that was changed with an updated synopsis.

18. The computer readable storage medium of claim 14, further comprising instructions which, when executed on the processor, cause the processor to perform the steps of retaining the synopsis for each portion of the table that was unchanged.

19. The computer readable storage medium of claim 11, wherein each base synopsis summarizes the statistic for a different portion of the table, and wherein the instructions which, when executed on the processor, cause the processor to perform the step of estimating the statistic comprise instructions which, when executed on the processor, cause the processor to perform the step of generating the statistic for the combination of the portions of the table.

20. The computer readable storage medium of claim 11, wherein each base synopsis summarizes the statistic for a different partition of the table.

* * * * *

UNITED STATES PATENT AND TRADEMARK OFFICE
CERTIFICATE OF CORRECTION

PATENT NO. : 7,603,339 B2
APPLICATION NO. : 11/796110
DATED : October 13, 2009
INVENTOR(S) : Thierry Cruanes et al.

It is certified that error appears in the above-identified patent and that said Letters Patent is hereby corrected as shown below:

On the Title Page, Item (56) On page 2, under "Other Publications", line 5, delete "l0g" and insert -- 10g --, therefor.

In column 1, line 7-11, delete "This application claims benefit of Provisional Application Ser. No. 60/919,379, filed Mar. 21, 2007, entitled "Efficient and Scalable Statistics Gathering for Large Databases," by Cruanes et al., the entire contents of which are incorporated by reference as if fully set forth herein." and insert -- This application claims benefit of Provisional Application Ser. No. 60/859,817, filed Nov. 16, 2006, entitled "Computing Approximate Number Of Distinct Values On Large Databases," by Cruanes et al., the entire contents of which are incorporated by reference as if fully set forth herein. --, therefor.

In column 1, line 12-14, delete "The present application is related to U.S. patent application Ser. No. 11/796,102, entitled "Approximating a Database Statistic," filed on Apr. 25, 2007, by Thierry Cruanes, et al." and insert -- This application claims benefit of provisional application Ser. No. 60/919,379, filed Mar. 21, 2007, entitled "Efficient and Scalable Statistics Gathering for Large Databases," by Cruanes et al., the entire contents of which are incorporated by reference as if fully set forth herein. --, therefor.

In column 1, line 15-17, delete "The present application is related to U.S. patent application Ser. No. 11/796,102, entitled "Approximating a Database Statistic," filed on Apr. 25, 2007, by Thierry Cruanes, et al." and insert -- The present application is related to U.S. patent application No. 11/796,102, entitled "Approximating a Database Statistic," filed on Apr. 25, 2007, by Thierry Cruanes, et al. --, therefor.

In column 5, line 5, delete "as," and insert -- $a_i$, --, therefor.

In column 5, line 9, delete "$h_{ij}$" and insert -- $h_{i'j'}$ --, therefor.

In column 12, line 57, delete "NDV=2*23=16." and insert -- NDV=2*$2^3$=16. --, therefor.

Signed and Sealed this

Seventh Day of September, 2010

David J. Kappos
*Director of the United States Patent and Trademark Office*